United States Patent Office 2,925,325
Patented Feb. 16, 1960

2,925,325

PROCESS FOR THE MANUFACTURE OF CRYOLITE

Jonas Kamlet, New York, N.Y., assignor to Reynolds Metals Company, Richmond, Va., a corporation of Delaware No Drawing. Application February 17, 1958
Serial No. 715,511

16 Claims. (Cl. 23—88)

This invention relates to a process for the manufacture of cryolite. More particularly, this invention relates to an efficient and economical process for the manufacture of silica-free cryolite (suitable for use in the electrolytic manufacture of aluminum) employing as the primary raw material a by-product from the processing of bauxite ores which has no present industrial utility.

Many bauxite and bauxitic ores found throughout the world (such as the extensive deposits mined in Arkansas) contain small amounts of fluoride (probably bound as calcium fluoride) and sulfide (probably bound as iron pyrites). These elements find their way into the "red mud" (the desilication residue) of the well-known Bayer process for the recovery of alumina from bauxite. It is now common practice in many plants to recover alumina and soda values from this "red mud" residue by sintering the same with limestone and soda ash (the so-called "combination process" or "soda-lime sinter process") and leaching sodium aluminate from the sinter. During the calcination of the "red mud" in this process, the pyrites are probably oxidized to iron sulfates. The sulfate ion in the latter and the fluoride in the $CaF_2$ are solubilized by the soda in the kiln feed, and are dissolved out of the sinter with the sodium aluminate leach liquors. After alumina recovery from these leach liquors, the spent liquors are concentrated for recycling to the process. During the concentration, the sulfate and fluoride precipitates out as a double salt of composition $$Na_2SO_4 \cdot NaF$$

which is filtered off and recovered. About 13.5 to 14.0 lbs. of this double salt are recovered per ton of Arkansas bauxite ore processed.

At present, this double salt by-product has no industrial use and is largely being discarded. It is the purpose of this invention to provide a process for the manufacture of silica-free cryolite whereby all of the alkali value of this double salt—$Na_2SO_4 \cdot NaF$—and all of the fluoride value are recovered as crolite and all of the sulfate value is utilized to replace and economize the cost of an equivalent amount of sulfuric acid in the supplying of the deficit of fluoride required to form $Na_3AlF_6$.

This invention may best be understood by a seriatim discussion of the steps thereof.

STEP I

The first step of this process involves the reaction of the double salt ($Na_2SO_4 \cdot NaF$) with an aqueous solution of fluoboric acid in the presence of a quantity of aluminum oxide or aluminum hydroxide, according to the equations:

$4(Na_2SO_4 \cdot NaF) + 5HBF_4 + 2Al_2O_3 + 9H_2O$
$\rightarrow 4Na_3AlF_6 + (5H_3BO_3 + 4H_2SO_4)$ (filtrate)

$4(Na_2SO_4 \cdot NaF) + 5HBF_4 + 4Al(OH)_3 + 3H_2O$
$\rightarrow 4Na_3AlF_6 + (5H_3BO_3 + 4H_2SO_4)$ (filtrate)

The solution of fluoboric acid, which is derived in the second step of this process, may contain considerable amounts of free boric acid. It may range in $HBF_4$ concentration from as low as 1% to as high as 75%. The reaction with the double salt and the alumina or aluminum hydroxide may be effected at any temperature from room temperature to 130° C. (at which temperature $HBF_4$ boils with decomposition). The reaction may be effected at subatmospheric, atmospheric or superatmospheric pressure.

As a source of the aluminum in the cryolite alumina (aluminum oxide) derived from any source whatever may be used (such as the calcined alumina from the Bayer process or the combined process). However, because of its greater reactivity I prefer to use aluminum hydroxide and preferably the washed, wet filter cake of aluminum hydroxide obtained in the Bayer process, prior to calcination to alumina.

For optimum reagent economy and yields, the double salt, aluminum oxide or hydroxide and fluoboric acid solution should be used in stoichiometric proportions, i.e. four moles of double salt, five moles of fluoboric acid, and four mole-equivalents of aluminum oxide or aluminum hydroxide. The cryolite formed is filtered off, washed with cold water and the combined filtrate and washings (containing boric acid and sulfuric acid) is used in the second step of the process to obtain the fluoboric acid required in the first step of the process.

I prefer to effect the reaction by digesting the double salt, the aluminum oxide or hydroxide and the fluoboric acid at 90° C. to 100° C. for one to two hours, with good agitation, and thereafter filtering off the $Na_3AlF_6$ precipitate from the solution of boric acid and sulfuric acid. The cryolite is washed with a little water and dried. These conditions are by no means critical and may be varied over wide ranges. Excellent yields of cryolite are obtained by this procedure.

STEP II

In the second step of this process, the filtrate and washings of boric acid and sulfuric acid obtained in the first step are digested with (a) a calcium-fluoride-containing material in quantity sufficient to react with all of the sulfuric acid present in said solution, and (b) an additional quantity of at least one member of the group consisting of hydrogen fluoride, silicon tetrafluoride and fluosilicic acid, the total quantity of fluoride-containing compounds used being sufficient to regenerate the aqueous solution containing 5 moles of $HBF_4$ required in the first step of the process, according to the equations:

$(5H_3BO_3 + 4H_2SO_4) + 4CaF_2 + 12HF$ (filtrate)
$\rightarrow 4CaSO_4 + 5HBF_4 + 15H_2O$ $(5H_3BO_3 + 4H_2SO_4) + 4CaF_2 + 3SiF_4$
$\rightarrow 4CaSO_4 + 3SiO_2 + 5HBF_4 + 9H_2O$ $(5H_3BO_3 + 4H_2SO_4) + 4CaF_2 + 2H_2SiF_6$
$\rightarrow 4CaSO_4 + 2SiO_2 + 5HBF_4 + 11H_2O$ The formation of fluoboric acid by the reaction of calcium fluoride in the presence of sulfuric acid and boric acid is well known (Heiser, Chemical Engineering Progress 45, #3, 169–179 (1949); U.S. Patents 2,182,509–511 (1939). This may be effected by the digestion of a calcium fluoride-containing material with sulfuric acid and boric acid in aqueous solution between room temperature and 100° C., at subatmospheric, atmospheric or superatmospheric pressures.

The calcium fluoride-containing material is preferably fluorspar (also known as fluorite, fluor and (in Great Britain) as Derbyshire spar). Although acid-grade fluorspar (containing a minimum of 95% $CaF_2$) is preferred for use in this process, much poorer grades of fluorspar may be used, since it is an inherent advantage of this process that the silica content of the fluorspar does not interfere with the formation of $HBF_4$, but remain behind as an insoluble precipitate which is filtered off. Thus, it is feasible to use fluorspars containing as little as 60% $CaF_2$. It is desirable to use fluorspars containing as little $CaCO_3$ as possible since this component only consumes sulfuric acid without corresponding $HBF_4$ formation. However, a high-silica fluorspar may be used almost entirely without reference to its silica content if its $CaCO_3$ is low. This permits the free use of low grade fluorspars in the process of this invention, which is not feasible with many present day cryolite processes.

The fluoboric acid formation is effected by digesting the fluorspar in an aqueous medium with sulfuric acid and boric acid. For optimum yields the sulfuric acid is used in amounts corresponding to that theoretically required for the reaction of the $CaCO_3$ in the fluorspar and the conversion of the $CaF_2$ to $HBF_4$. The fluorspar is used in amounts equivalent to 100% to 110% of the theoretical.

The digestion of the fluorspar, sulfuric acid and boric acid in solution is effected for a period of time sufficient to convert substantially all of the fluoride in the calcium fluoride to $HBF_4$, usually from 2 to 8 hours at 80° to 100° C. At the conclusion of this period, the calcium sulfate may optionally be filtered from the solution, which now contains $HBF_4$ and free $H_3BO_3$. However, this filtration may be dispensed with, as will be obvious from the description below.

After the conversion of the sulfuric acid in the solution from Step I to $HBF_4$, the reaction mixture is treated with hydrogen fluoride, silicon tetrafluoride or fluosilicic acid. These reagents may be introduced into the reaction mixture as gases (in the case of the HF and the $SiF_4$) or as aqueous solutions (in the case of the HF, the $SiF_4$ and the $H_2SiF_6$). These reagents are introduced into the reaction mixture (containing $HBF_4$ and free $H_3BO_3$ and (if this has not been previously filtered off) $CaSO_4$ from the reaction of the $CaF_2$ with the sulfuric acid and boric acid formed in Step I), in quantity sufficient to form a total of five moles of $HBF_4$ in the solution. These reagents may be introduced at any convenient temperature and pressure, but the reaction is rapid and complete at ambient temperatures and atmospheric pressure.

The hydrogen fluoride used in this process may be obtained from any of the conventional sources. Thus, the HF generated by the reaction of fluorspar with sulfuric acid, in the equipment conveniently used in the industry for this purpose, is ideally suited for this purpose. Here again, it is not necessary to use an acid-grade fluorspar. When high-silica fluorspars are used for the generation of HF, the product obtained contains considerable amounts of $SiF_4$. However, this $SiF_4$ reacts with the boric acid in the solution to form $HBF_4$ and precipitate silica. It is therefore entirely feasible to use high-silica fluorspars (preferably with as little $CaCO_3$ as possible) in the process of this invention, for the generation of the HF required, which is impractical with most cryolite processes of the present art.

An excellent source for the HF required in this process is the residual HF gas from the process now employed by the aluminum industry to manufacture aluminum fluoride. Hydrogen fluoride is generated in stills by the reaction of sulfuric acid with fluorspar, and is passed at advanced temperatures over alumina in rotary kilns. A certain portion of the HF (about 20% of the total) passes unreacted through the kilns, carrying with it most of the $SiF_4$ formed in the fluorspar stills. This unabsorbed HF gas (containing $SiF_4$) is ideally suited for the process of this invention.

Similarly, the HF and $SiF_4$ from the den gases generated in the acidulation of phosphate rock, as well as the fluosilicic acid ($H_2SiF_6$) formed by the absorption of these gases in water, are suited for use in the process of this invention.

Other sources of HF suitable for use in this process are the anode off-gases from the electrolytic manufacture of aluminum (containing HF and $SiF_4$ in addition to $CO_2$, CO and smaller amounts of $CF_4$, $SO_2$, moisture and hydrocarbons). Other primary and by-product sources of HF, $SiF_4$ and $H_2SiF_6$ are equally suited for the process of this invention.

It has been found that the best yields of fluoboric acid and the lowest silica retention in the $HBF_4$ solution have been obtained by employing boric acid in amounts equivalent to 120% to 150% of the amount theoretically required for $HBF_4$ formation. Since this excess of boric acid simply recycles in the process, without loss, the use of this stoichiometric excess in no way adds to the cost of the process.

At the conclusion of the digestion of the $H_3BO_3$—$H_2SO_4$ solution with the fluorspar, the $CaSO_4$ may be filtered off. However, it is entirely feasible to dispense with this filtration, and to use the $H_3BO_3$—$HBF_4$ solution containing suspended $CaSO_4$ to react with the HF, $SiF_4$ or $H_2SiF_6$. The silica (introduced as $SiF_4$ in the HF, or as $H_2SiF_6$ and precipitated by the reaction with $H_3BO_3$) may then be filtered off together with the $CaSO_4$. This obviates a filtration step in the process.

In the process of my invention, the filtrate from the first step (containing at least 5 moles of boric acid, and preferably from 120% to 150% as much (i.e. 6 to 7.5 moles of boric acid) and 4 moles of sulfuric acid) is mixed with sufficient fluorspar (or other calcium fluoride-containing material) to react with all the sulfuric acid present. Since fluorspar usually contains small amounts of $CaCO_3$, this component will consume a little of the sulfuric acid and correspondingly less $HBF_4$ will be obtained. Thus, it is feasible to add a little sulfuric acid to compensate for this loss of reagent due to $CaCO_3$ content of the fluorspar. However, since this deficit is ultimately compensated by the addition of HF, $SiF_4$ or $H_2SiF_6$ to the reaction mixture, and since these compounds are usually made from fluorspar and sulfuric acid, the economics of the process are substantially the same whether the sulfuric acid is added in the fluorspar still or in the reaction mixture of this process to compensate for losses due to $CaCO_3$ content of the fluorspar.

The reaction of the $H_3BO_3$—$H_2SO_4$ solution with the fluorspar may be effected over a wide range of reagent concentrations, at subatmospheric, atmospheric and superatmospheric pressures, at temperatures between room temperature and 130° C. I prefer to effect this digestion of the fluorspar at temperatures between 80° C. and 100° C. for periods of time ranging from two to eight hours.

At the conclusion of this reaction period (after which the $CaSO_4$ formed may optionally be filtered off), HF or $SiF_4$ is introduced into the reaction mixture (e.g. as gases, through sparger tubes or diffusers) or HF, $SiF_4$ or $H_2SiF_6$ may be introduced as aqueous solutions, in amounts sufficient to form a total of five moles of $HBF_4$ in solution. The percipitate of $CaSO_4$ and $SiO_2$ is filtered off, the filter cake is washed with a little water and the combined filtrate and washings, containing 5 moles of $HBF_4$ are returned to the first step of the process.

It is entirely feasible (and may indeed be preferable) to reverse the order of these reactions. The solution of $H_2SO_4$ and $H_3BO_3$ from the first step of the process may be reacted first with HF, $SiF_4$ or $H_2SiF_6$, in the proportions indicated above. The $SiO_2$ formed (if any) may optionally be filtered off, and the filtrate of $HBF_4$ and $H_2SO_4$ (which may contain $SiO_2$ if this has not been filtered off) is then digested with fluorspar, to form the solution containing 5 moles of $HBF_4$ and a precipitate of $CaSO_4$ (and $SiO_2$ if this has not previously been filtered off). The filter cake is washed with a little water and the combined filtrate and washings (containing 5 moles of $HBF_4$) are returned to the first step of the process.

It is also entirely feasible to effect both reactions simultaneously, i.e. to digest the $H_2SO_4$—$H_3BO_3$ solution from Step I with fluorspar, while simultaneously passing into or adding to the reaction mixture HF, $SiF_6$ or $H_2SiF_6$ in gaseous form or as aqueous solutions. At the conclusion of this reaction, $CaSO_4$ and $SiO_2$ are filtered from the solution containing fluoboric acid and the latter is returned to the first step of the process. It is only essential that the total dissolved fluoride in the solution (from the reactions of the $CaF_2$ with the $H_2SO_4$ plus the added HF, $SiF_4$ or $H_2SiF_6$) is sufficient to produce, upon reaction with the boric acid present, the five moles of fluoboric acid required in the first step of the process.

The following examples are given to define and to illustrate this invention, but in no way limit it to reagents, proportions or conditions described therein. Obvious modification will occur to any person skilled in the art.

Example I

To 4 liters of a solution containing 440 gms. of fluoboric acid (5 moles) and 124 gms. of boric acid (2 moles), add 736 gms. of double salt ($Na_2SO_4 \cdot NaF$) (4 moles) and sufficient washed filter cake from the Bayer process to contain 312 gms. of $Al(OH)_3$ (4 moles), (e.g. 381 gms. of the filtercake containing 82% $Al(OH)_3$, prior to calcination). The reaction mixture is heated, with agitation, at 90° C. to 100° C. for one to two hours, the precipitated cryolite is filtered off, the filtercake is washed with a little hot water, the filtrate and washings are combined and the washed $Na_3AlF_6$ is dried by the processes well known in the art.

The filtrate and washings (about 4.5 liters) containing 392 gms. $H_2SO_4$ (4 moles) and 433 gms. of boric acid (7 moles) is now mixed with 370 gms. of a finely ground fluorspar (analyzing 84.5% $CaF_2$, 2.8% $CaCO_3$ and 12.7% $SiO_2$). The fluorspar added contains the equivalent of 312.6 gms. of $CaF_2$ (4.00 moles) and 10.4 gms. of $CaCO_3$ (0.104 mole). The reaction mixture is digested at 90° C. to 95° C. with agitation for three hours. At the conclusion of this period (during which some concentration of the reaction mixture has occurred by evaporation of water), it will be found that the reaction mixture contains 1.925 moles of $HBF_4$. At this point, $CaSO_4$ may optionally be filtered off.

The reaction mixture is now cooled to room temperature, and hydrogen fluoride gas (which may contain silicon tetrafluoride) is introduced into the reaction mixture until the equivalent of 246.2 gms. of HF (total of HF and $SiF_4$ calculated as HF) (12.3 moles) has been absorbed. The reaction mixture is now filtered, and the filtercake is washed with a little hot water. The filtrate and washings are now combined. There is thus obtained about four liters of a solution containing 440 gms. of fluoboric acid (5 moles) and 124 gms. of boric acid (2 moles). This solution is recycled to the first step of the process.

Example II

Hydrofluoric acid (which may contain some $SiF_4$) is passed at room temperature into 4.5 liters of a solution containing 392 gms. of $H_2SO_4$ (4 moles) and 433 gms. of boric acid (7 moles), until a quantity of HF and $SiF_4$ equivalent to 248 gms. of HF (12.4 moles) has been absorbed. To this reaction mixture is now added 370 gms. of finely ground fluorspar (of the composition indicated in Example I) and the reaction mixture is digested at 90° C. to 95° C. with agitation for three hours. At the conclusion of this period, the precipitate of $CaSO_4$ and $SiO_2$ is filtered off, the filtercake is washed with a little hot water and the filtrate and washings are combined.

There will thus be obtained about 4 liters of a solution containing 440 gms. of fluoboric acid (5 moles) and 124 gms. of boric acid (2 moles). To this solution is added 736 gms. of double salt ($Na_2SO_4 \cdot NaF$) (4 moles) and 312 gms. of aluminum hydroxide (4 moles). The reaction mixture is heated, with agitation, at 90° C. to 100° C., for two hours, the precipitated cryolite is filtered off, the filtercake is washed with a little hot water, the filtrate and washings are combined and the washed $Na_3AlF_6$ is dried. The combined filtrate and washings (about 4.5 liters containing 392 gms. $H_2SO_4$ and 433 gms. $H_3BO_3$) are employed for the absorption of the HF, as above described.

On recycling of mother liquors, the materials balance of this process may be given as follows:

736 parts of double salt ($Na_2SO_4 \cdot NaF$)
312 parts of aluminum hydroxide (or 204 parts of alumina)
370 parts of fluorspar (analyzing 84.5% $CaF_2$, 2.8% $CaCO_3$ and 12.7% $SiO_2$) (or equivalent of 312.6 parts of $CaF_2$)
247 parts of hydrogen fluoride yield 808 to 815 parts of cryolite ($Na_3AlF_6$)

and a residue of calcium sulfate and silica which is discarded.

The cryolite made by this process analyzes 99.73% $Na_3AlF_6$, with less than 0.20% $SiO_2$ and less than 0.02% $Fe_2O_3$. It must be emphasized that this process, unlike any process of the prior art, does not require caustic soda or soda ash as a primary raw material. All of the sodium in the cryolite is supplied as the double salt ($Na_2SO_4 \cdot NaF$). Similarly one-sixth of the fluorine in the final cryolite is supplied by the double salt. Finally 40% of the sulfuric acid used in the process for the preparation of the fluoboric acid and the hydrofluoric acid is derived by the utilization of the sulfate ion in the double salt. Thus, we derive a complete utilization of a product which is obtained in appreciable amounts as a by-product in bauxite processing and which has never been used industrially before.

On the basis of a yield of 1.0 ton of alumina from 2.2 tons of bauxite (combined process) and an alumina: aluminum factor of 1.91, and a recovery of 13.5 lbs. of double salt per ton of bauxite processed, the double salt recovered from Arkansas bauxite will be equivalent to 56.7 lbs. per ton of aluminum produced. This amount of double salt will yield about 62.4 lbs. of cryolite. Since cryolite consumption in the electrolytic aluminum process varies from 47.0 to 60.0 lbs. per ton of aluminum produced, this process provides an ideal materials balance. By the recovery of the double salt in Arkansas bauxite ore and conversion to cryolite by the process of this invention sufficient cryolite can be obtained to provide all of the "make-up" in the electrolytic cells converting the alumina obtained from said bauxite ore to aluminum.

While the preferred raw material for the process of this invention is the double salt of composition

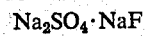
$Na_2SO_4 \cdot NaF$ obtained during the concentration of the spent liquors from the recovery of alumina from the sodium aluminate leach liquors of the soda-lime sintering of Bayer process "red mud," it is obvious and understood that a mixture of equimolar amounts of sodium fluoride and sodium sulfate (e.g. salt cake, Glauber's salts), or a synthetically prepared co-precipitate of $Na_2SO_4 \cdot NaF$ double salt may be used as a raw material in the process of this invention.

Having described my invention, what I claim and desire to protect by Letters Patent is:

1. A process for the manufacture of cryolite which comprises the steps of:

(a) reacting an solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

2. A process for the manufacture of cryolite which comprises the steps of:

(a) reacting an aqueous solution containing five moles of fluoboric acid with four moles of a double salt of composition $Na_2SO_4 \cdot NaF$ and four mole-equivalents of a member of the group consisting of aluminum hydroxide and aluminum oxide;

(b) separating the precipitate of cryolite from the solution of boric acid and sulfuric acid;

(c) reacting said solution of boric acid and sulfuric acid with a quantity of a calcium fluoride-containing material in quantity at least sufficient to react with all of the sulfuric acid in the reaction mixture and with at least one member of the group consisting of hydrogen fluoride, silicon tetrafluoride and fluosilicic acid in quantity sufficient to form a total of five moles of fluoboric acid in solution and a precipitate of calcium sulfate; and (d) separating the calcium sulfate from the solution of five moles of fluoboric acid and returning said solution of fluoboric acid to step (a) of the process.

3. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide, said double salt being derived from the spent sodium aluminate leach liquors of the soda-lime sintering of the "red mud" desilication residue of the Bayer alumina process;

(b) separating the precipitate of cryolite from the solution of boric acid and sulfuric acid;

(c) reacting said solution of boric acid and sulfuric acid with a calcium fluoride-containing material and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

4. A process for the manufacture of cryolite which comprises the steps of:

(a) reacting an aqueous solution containing fluoboric acid (free boric acid being present in said solution) with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and at least one member of the group consisting of hydrogen fluoride, silicon tetrafluoride and fluosilicic acid in quantity sufficient to form an amount of fluoboric equivalent to the quantity employed in step (a) and a precipitate of calcium sulfate; and (d) separating the calcium sulfate from the solution of fluoboric acid and returning said solution of fluoboric acid to step (a) of the process.

5. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide in an aqueous medium at a temperature of between 90° C. and 100° C.;

(b) separating the precipitate of cryolite from the solution of boric acid and sulfuric acid;

(c) reacting said solution of boric acid and sulfuric acid with a calcium fluoride-containing material and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

6. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with fluorspar and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

7. A process for the manufacture of cryolite which comprises the steps of:

(a) reacting an aqueous solution, containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with fluorspar high in silica content and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

8. A process for the manufacture of cryolite which comprises the steps of:

(a) reacting an aqueous solution containing five moles of fluoboric acid with four moles of a double salt of composition $Na_2SO_4 \cdot NaF$ and four mole-equivalents of a member of the group consisting of aluminum hydroxide and aluminum oxide;

(b) separating the precipitate of cryolite from the solution of boric acid and sulfuric acid;

(c) reacting said solution of boric acid and sulfuric acid (in the form of an aqueous medium containing from 5.0 to 7.5 moles of boric acid and 4.0 moles of sulfuric acid) with a quantity of a calcium fluoride-containing material in quantity at least sufficient to react with all of the sulfuric acid present in the reaction mixture and with at least one member of the group consisting of hydrogen fluoride, silicon tetrafluoride and fluosilicic acid in quantty sufficient to provide the equivalent of at least 12 moles of HF, the total quantity of fluoride reacting being sufficient to form a total of five moles of fluoboric acid in solution and a precipitate of calcium sulfate; and (d) separating the calcium sulfate from the solution of five moles of fluoboric acid and returning said solution of fluoboric acid to step (a) of the process.

9. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting, at a temperature between 80° C. and 100° C. for two to eight hours, said solution of boric acid and sulfuric acid with a calcium fluoride-containing material and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

10. A process for the manufacture of cryolite which comprises the steps of:

(a) reacting an aqueous solution containing fluoboric acid with an equimolecular mixture of sodium sulfate and sodium fluoride and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

11. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and gaseous hydrogen fluoride in quantity sufficient to form an amount of fluoboric acid equivalent to the quantity employed in step (a) and a precipitate of calicum sulfate; and (d) separating the calcium sulfate from the solution of fluoboric acid and returning said solution of fluoboric acid to step (a) of the process.

12. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and gaseous silicon tetrafluoride in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

13. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and an aqueous solution of a member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

14. A process for the manufacture of cryolite which comprises the steps of:

(a) reacting an aqeous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and thereafter with at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

15. A process for the manufacture of cryolite which comprises the steps of:

(a) reacting an aqeous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material after first reacting said solution with at least one member of the group consisting of hydrogen fluoride, silicon tetrafluoride and fluosilicic acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

16. A process for the manufacture of cryolite which comprises the steps of:

(a) reacting an aqeous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and concurrently reacting said solution with at least one member of the group consisting of hydrogen fluoride, silicon tetrafluoride and fluosilicic acid in quantity sufficient to form an amount of fluoroboric acid equivalent to the quantity employed in step (a) and a precipitate of calcium sulfate; and (d) separating the calcium from the solution of fluoboric acid and returning said solution of fluoboric acid to step (a) of the process.

References Cited in the file of this patent

UNITED STATES PATENTS

| | | |
|---|---|---|
| 2,182,510 | Heiser | Dec. 5, 1939 |
| 2,692,186 | Kamlet | Oct. 19, 1954 |
| 2,790,705 | Kean et al. | Apr. 30, 1957 |
| 2,799,559 | Sullivan et al. | July 16, 1957 |

UNITED STATES PATENT OFFICE
CERTIFICATE OF CORRECTION

Patent No. 2,925,325            February 16, 1960

Jonas Kamlet

It is hereby certified that error appears in the printed specification of the above numbered patent requiring correction and that the said Letters Patent should read as corrected below.

Column 4, line 56, for "percipitate" read -- precipitate --; column 6, line 67, before "solution" insert -- aqueous --; column 7, line 62, after "fluoboric" insert -- acid --; column 8, line 66, for "quantty" read -- quantity --; column 10, line 66, after "calcium" insert -- sulfate --.

Signed and sealed this 4th day of October 1960.

(SEAL)
Attest:

KARL H. AXLINE            ROBERT C. WATSON
Attesting Officer            Commissioner of Patents